United States Patent [19]
Lucas

[11] 3,721,122
[45] March 20, 1973

[54] AUTOMATIC RECORDING RAIN GAUGE

[75] Inventor: Colin Frank Lucas, Yateley, Camberley, England

[73] Assignee: National Research Development Corporation, London, England

[22] Filed: Nov. 30, 1970

[21] Appl. No.: 93,716

[30] Foreign Application Priority Data

Dec. 1, 1969  Great Britain......................58,502/69

[52] U.S. Cl................................................73/171
[51] Int. Cl...............................................G01w 1/14
[58] Field of Search.........73/171, 227, 232, 223, 224

[56] References Cited

UNITED STATES PATENTS

| | | | |
|---|---|---|---|
| 3,472,168 | 10/1969 | Inoue et al. | 73/304 R X |
| 1,974,857 | 9/1934 | Winton | 73/232 X |
| 3,243,999 | 4/1966 | Barker | 73/171 |

Primary Examiner—Jerry W. Myracle
Attorney—Cushman, Darby & Cushman

[57] ABSTRACT

According to the present invention a rain gauge comprises a container for collecting rain, a pump operative to pump rain water from the container, an electrical sensor responsive to the level of rain water in the container and operative to make and break the supply of power to the pump and means responsive to the drive motion of the pump for affording a measure of rain water collected in and pumped from the container.

In order that the amount of rain water pumped, during each revolution of the pump, is repeatable to a very high accuracy a peristaltic pump may be used.

Indicator means, for example a revolution counter or an electronic counter, may be provided to record the drive motion of the pump.

8 Claims, 4 Drawing Figures

AUTOMATIC RECORDING RAIN GAUGE

This invention relates to apparatus for automatically recording rainfall.

Various mechanical methods of measuring rainfall automatically are known, for example the 'tipping bucket' method, in which a specially shaped bucket is pivoted such that when it is empty it is positioned in an equilibrium position. When the rain, collected in the bucket reaches a given level, the center of gravity of the bucket and water system moves and produces a turning moment about the pivot. The bucket tips up and in so doing discharges the rain water and returns to its empty equilibrium position. The number of tipping actions is this seen to be directly proportional to the amount of rainfall.

The object of the present invention is to provide alternative apparatus for automatically recording rainfall.

According to the present invention a rain gauge comprises a container for collecting rain, a pump operative to pump rain water from the container, an electrical sensor responsive to the level of rain water in the container and operative to make and break the supply of power to the pump and means responsive to the drive motion of the pump for affording a measure of rain water collected in and pumped from the container.

In order that the amount of rain water pumped, during each revolution of the pump, is repeatable to a very high accuracy a peristaltic pump may be used.

Indicator means, for example a revolution counter or an electronic counter, may be provided to record the drive motion of the pump. The indicator means may be remote from the rain gauge, the pump revolution information being transmitted to it e.g. by telemetry. A number of such rain gauges at different remote out-stations can thus be monitored at a central measuring station.

In a preferred arrangement the electrical sensor means is connected to an electronic switching unit which is operative to make and break the supply of power to an electric motor which drives the pump.

During use, rain is collected in the container. When the rain level rises to a predetermined level in this container the electrical sensor means operates on the electronic switching unit which connects the electrical power supply to the electric motor. The electric motor drives the pump which pumps the rain water in the container away to waste. As the rain level in the container falls below a lower predetermined level in the container the electrical sensor means operates on the electronic switching unit which disconnects the electrical power supply to the electric motor, which stops. The pumping action thus ceases, until further rainfall causes the cycle to be repeated. The number of revolutions of the pump drive shaft, as recorded by a revolution counter connected to it, is thus seen to be directly proportional to the amount of rain falling.

An automatic recording rain gauge constructed in accordance with the invention will now be described by way of example only, and with reference to the accompanying diagrammatic drawings of which:

Figure 1:
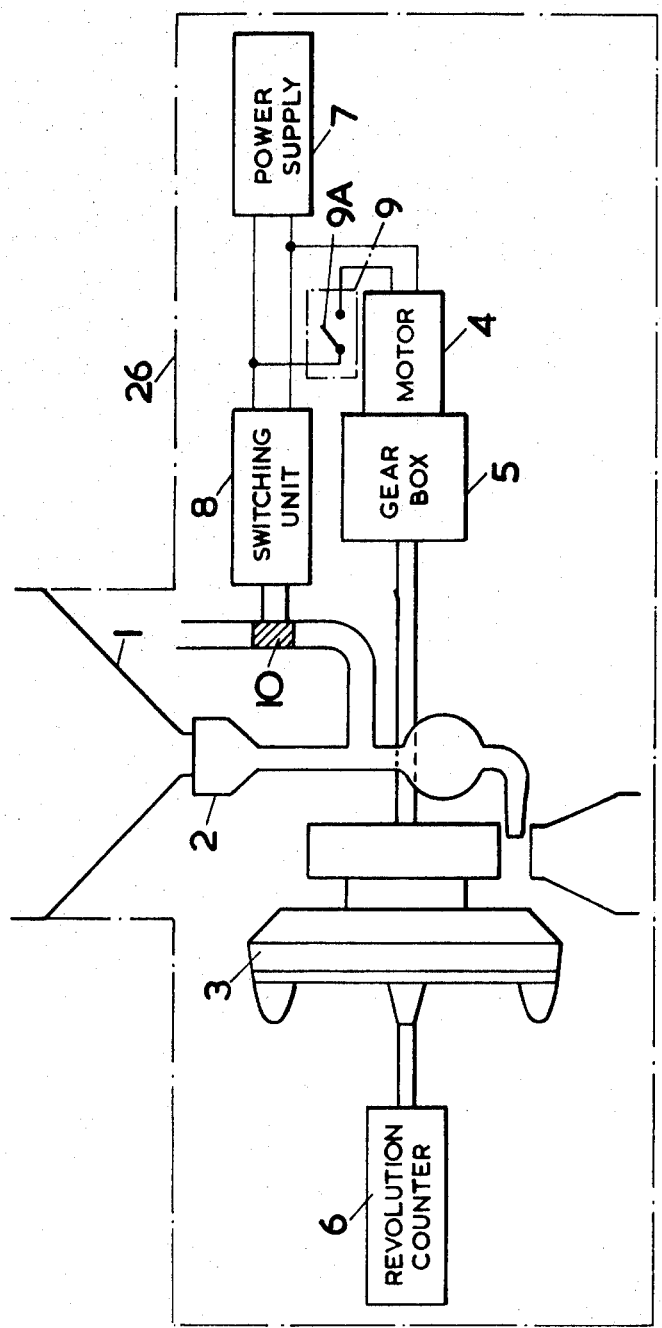
FIG. 1 is a general layout diagram of the rain gauge.

FIG. 1 shows an atuomatic recording rain gauge including essentially a rain collecting funnel 1, a container 2, a peristaltic pump 3 with associated d.c. electric drive motor 4, gearbox 5 and revolution counter 6, a d.c. electrical power supply 7, an electronic switching unit 8, a relay contact 9A of a relay 9 and an electrical sensor 10 which is mounted in the container 2.

Figure 2:
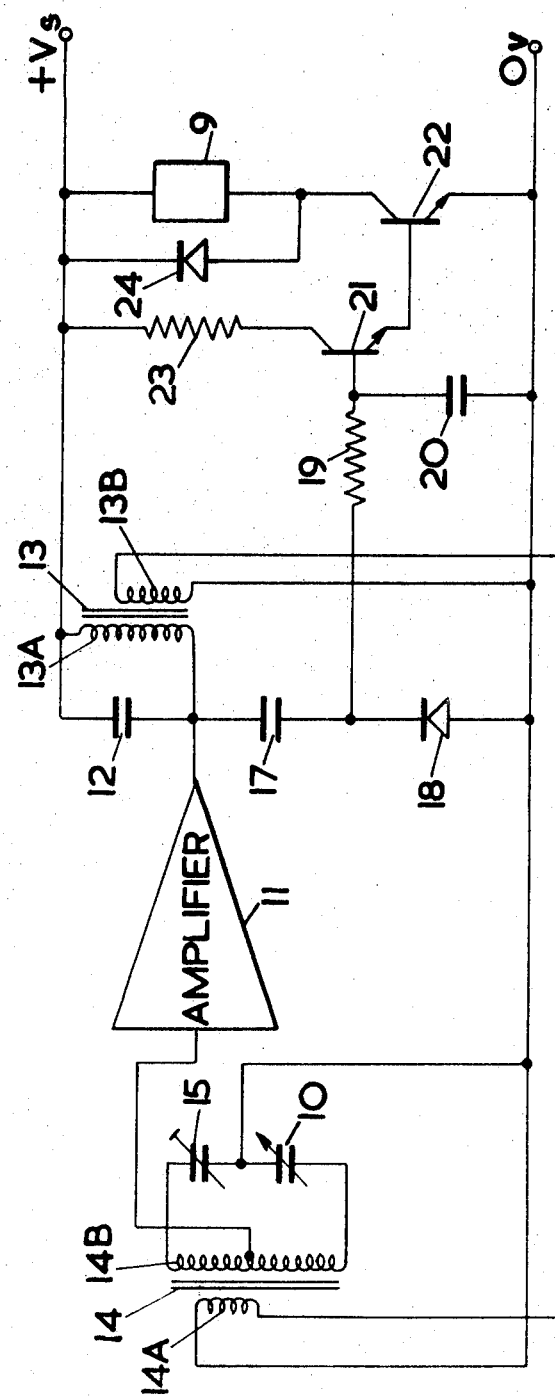
FIG. 2 is a circuit diagram of one form of electrical sensor means and electronic switching unit.

At FIG. 2 one form of the electronic switching unit, shown at 8 in FIG. 1, has an amplifier 11 having a tuned output load comprising a capacitor 12 and a primary winding 13A of a transformer 13. The input circuit of amplifier 11 is a capacitance bridge, consisting of a secondary winding 14B of a transformer 14, a capacitor 15 and a variable capacitor sensor 10. The output phase of the bridge depends on the value of the variable capacitor sensor 10, which is one form of the electrical sensor means shown at 10 in FIG. 1. A feedback path 16 is included between a secondary winding 13B of the transformer 13 and a primary winding 14A of the transformer 14. The output of the amplifier 11 is also coupled by means of a capacitor 17 to a rectifier circuit comprising a diode 18 and a smoothing circuit comprising a resistor 19 and a capacitor 20. The smoothing circuit is connected to a transistor switch comprising a transistor 21, a transistor 22 and a resistor 23. The collector of transistor 22 is connected to the relay 9 (also shown at FIG. 1). The transistor 22 is protected by a diode 24. The electronic switching unit, shown at 8 in FIG. 1 can be connected to the d.c. electrical power supply, shown at 7 in FIG. 1 or to a separate d.c. electrical power supply.

The d.c. electric motor 4 shown at FIG. 1 is connected through the contact 9A of the relay shown at 9 in FIG. 2 to the d.c. electrical power supply shown at 7 in FIG. 1.

The whole rain gauge is mounted in a suitable container shown at 26 in FIG. 1.

The operation of the rain gauge will now be described with reference to FIGS. 1 and 3.

In operation the rain gauge is mounted in an exposed position at the place at which it is required to measure the rainfall. Rain is collected by means of the rain collecting funnel 1 in the container 2. As the rain level in the container 2 rises the capacitance of the variable capacitor liquid level sensor 10 will increase. When the capacitance of the sensor 10 exceeds that of capacitor 15 by a predetermined amount the feedback through the feedback path 16 becomes positive and the circuit including the amplifier 11 will oscillate. The diode 18 rectifies the alternating output and the resistors 19 and the capacitor 20 smooths the resultant positive d.c. voltage. This voltage is applied to the base of the transistor 21 causing it to conduct. The transistors 21 and 22 form a double emitter follower, hence when the transistor 21 conducts the transistor 22 also conducts. The Resistor 23 limits the base current of transistor 22 when it conducts. The collector potential of the transistor 22 thus falls to near Ov. The relay 9 is thus energized and the d.c. electrical power supply 7 is connected to the d.c. electric motor 4. The motor drives the peristaltic pump 3 which pumps away the rain water in the container 2 to waste. As the level of rain water in the container falls, the capacitance of the sensor 10 will be reduced. When the capacitance of the sensor 10 falls to a predetermined value the feedback through the feedback path 16 becomes negative. The circuit including the amplifier 11 will then cease to oscillate and in the absence of a rectified positive d.c. voltage level at the base of the transistor 21 that transistor will cease to conduct as will the transistor 22. The collector potential of the transistor 22 rises to the positive d.c. power supply voltage and the relay 9 is de-energized. The d.c. electric motor 4 is disconnected from the d.c. electrical power supply 7, and stops. The peristaltic pump 3 is no longer driven and pumping action stops.

Further rainfall will raise the level in the container once more and the above cycle will be repeated. As the rainfall continues the pump will be switched on and off alternately. Since the peristaltic pump pumps an amount of rain water, which is accurately repeatable, during each revolution, the number of revolutions of the pump as indicated by the revolution counter 6 is directly proportional to the amount of rainfall.

It should be noted that during each cycle of pumping not all the water in the container is pumped away to waste. It is therefore important, before starting to use the rain gauge, that the container is filled with water to a level at which the pumping action will just cease during subsequent use.

It should further be noted that the amplifier in the electronic switching unit 8 described in the above example draws a continuous current, of the order of 10 mA, from the power supply. Also if the variable capacitor sensor 10 is remote from the remainder of the bridge circuit it must be connected to the circuit by double screened cable to prevent stray capacitances from shunting the capacitance of the variable capacitor sensor 10.

Figure 3:
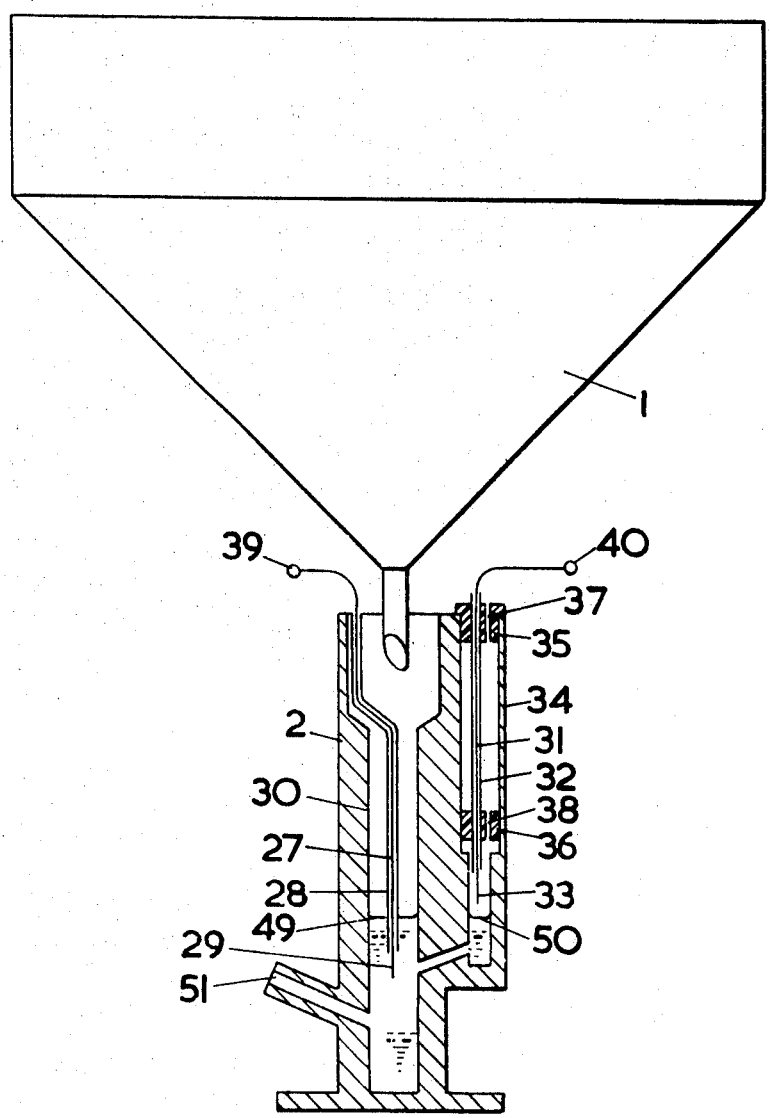
FIG. 3 is another form of electrical sensor means.

In another form of the rain gauge, operating on the same principle and substantially of the same form as described in the example above with reference to FIG. 1, the electrical sensing means 10 comprises a two terminal level sensor shown at FIG. 3. The sensor comprises a first copper wire probe 27 and a second copper wire probe 31. The probe 27 is covered by an insulating sleeve 28 for a majority of its length but has an unsleeved portion 29 and is partly located within and fixedly attached to a tubular arm 30 of the container 2 also shown in FIG. 1, such that said unsleeved portion is immersed in rain water collected in said container by the rain collecting funnel 1, also shown in FIG. 1. The second probe 31 is covered by an insulating sleeve 32 for a majority of its length but has an unsleeved portion 22 and is partly located axially within a tubular arm 34 of the container 2 by means of two cylindrical sleeves 35 and 36. The sleeves 35 and 36 are made of an electrically insulating material e.g. P.I.F.E. and have bores 37 and 38 respectively, venting the interior of the arm 34 to the surrounding atmosphere. The unsleeved portion 33 of the probe 31 is at a higher level within arm 34 than the unsleeved portion 29 of the probe 27 within arm 30 when the container 2 is erect as shown at FIG. 3. The probe 27 and the probe 31 are connected by means of terminals 39 and 40 respectively to the electronic switching unit shown at 8 in FIG. 1.

Figure 4:
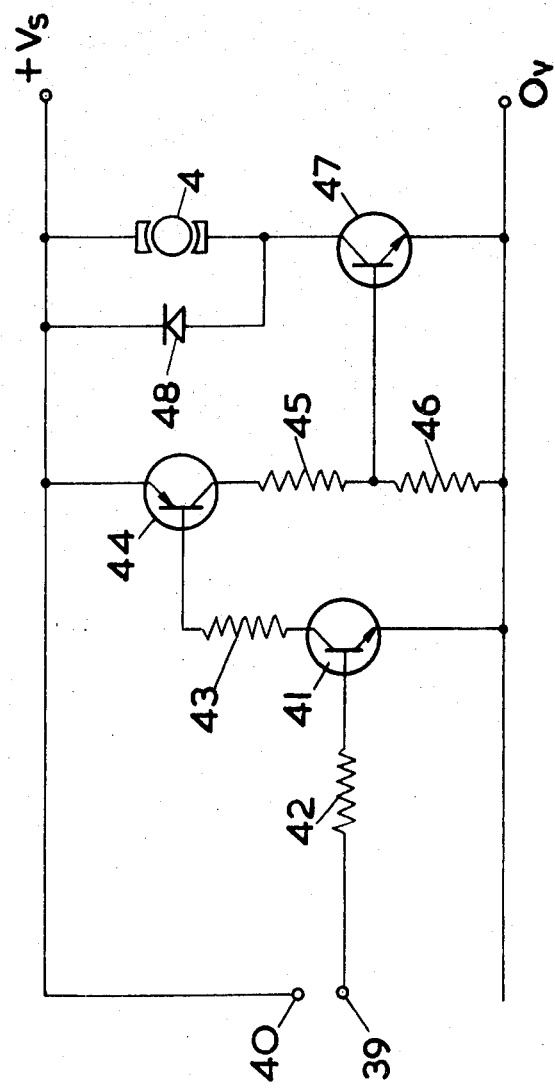
FIG. 4 is a circuit diagram of another form of electronic switching unit for use with the electrical sensor means shown at FIG. 3.

The electronic switching unit 8 to be used in conjunction with the circuit described with reference to FIG. 3 is shown at FIG. 4. The relay shown at 9 in FIG. 1 is not used in this form of the rain gauge. The electronic switching unit comprises a transistor 41 having a base current limiting resistor 42 which is connected to the terminal 39, and a collector current limiting resistor 43. The resistor 43 also limits the base current of a transistor 44 the state of which is controlled by the transistor 41. The output from the collector of the transistor 44 is connected to a potential divider network comprising a resistor 45 and a resistor 46. The junction of resistors 45 and 46 is connected to the base of a transistor 47 the load of which comprises the electric motor 4 shown at FIG. 1. The transistor 47 is protected by a diode 48. The positive supply voltage from the electrical power supply shown at 7 in FIG. 1 is connected to terminal 40 and to the emitter of transistor 44.

The operation of this form of the rain gauge will now be described, with reference to FIGS. 3 and 4.

Initially, the level of water in the arms 30 and 34 might be as indicated by lines 49 and 50 respectively, such that the unsleeved portion 29 of the probe 27 is immersed in water, but the unsleeved portion 33 of the probe 31 is not immersed. In this condition the input terminals 39 and 40 to the electronic switching unit are electrically isolated.

As rain falls and is collected, as described in the previous example, the level of water in the container rises until the unsleeved portion 33 of the probe 31 is immersed in the water. When the probes 27 and 31 are thus both in contact with the water a low resistance path is formed between terminals 39 and 40. The positive supply voltage from the electrical power supply shown at 7 in FIG. 1 is thereby applied to the base of the transistor 41 through the resistor 42 causing it to conduct. The collector potential of the transistor 41 falls to near 0v and causes the transistor 44 to conduct. The resistor 43 limits the collector to emitter current of the transistor 41 and the base current to the transistor 44 when these transistors are conducting. The collector potential of the transistor 44 rises until the transistor 44 is fully conducting and the positive supply voltage is thereby applied to the potential divider network comprising the resistors 45 and 46. A positive voltage is thus applied to the base of the transistor 47 causing it to conduct. The collector potential of the transistor 47 falls to near 0v and the full supply voltage is thereby applied to the d.c. electric motor 4. The d.c. electric motor is thus switched on and drives the pump, shown at 3 in FIG. 1, which pumps the rain water in the container, shown at 2 in FIG. 1 away to waste via the outlet 51 as described in the previous example.

As the rain level in the arm 34 falls below the unsleeved portion 33 of the probe 31, terminals 39 and 40 are disconnected. The base potential of the transistor 41 thereby falls to near 0v and the transistor no longer conducts. By cumulative action the transistors 44 and 47 also cease to conduct. The collector potential of the transistor 47 rises to the positive supply voltage and the supply voltage is thus no longer applied to the d.c. electric motor 4, which stops. Pumping action thus ceases until further falls of rain cause the cycle to be repeated.

As in the previous example of the rain gauge, the number of revolutions of the pump drive shaft as recorded by the revolution counter is directly proportional to the amount of rain falling, provided that, as before, when starting to use the rain gauge the container is first filled with water to a level at which the pumping action will just cease during subsequent use.

The electronic switching unit in this case only draws current from the power supply when the sensor terminals are electrically connected. This makes this type of rain gauge capable of operating from low capacity batteries and thus suitable for long periods of use in unattended out-stations.

Although a peristaltic pump is specified in the two example of the rain gauge described above, it is to be noted that any form of positive displacement pump, in which the throughput can be related to the number of pumping cycles and which can be adapted to indicate conveniently the number of pumping cycles that have taken place, may be used e.g. a reciprocating pump or a rotary vane pump.

I claim:

1. A rain gauge comprising a rainwater-collection container, a positive-displacement pump connected to pump rainwater from the container, sensor means for detecting when the level of rainwater collected in the container reaches an upper predetermined level and when the said level falls below a lower predetermined level, switching means controlled by the sensor means, for starting the pump whenever the collected rainwater reaches the upper predetermined level and for stopping the pump whenever the level of the collected rainwater falls below the lower predetermined level, and measuring means coupled to the pump for providing a representation of the number of cycles of operation of the pump and thereby affording a measure of the amount of rainwater collected in and pumped from the container.

2. A rain gauge as claimed in claim 1 and wherein the pump is a peristaltic pump.

3. A rain gauge as claimed in claim 1 wherein the pump comprises an electric motor and a positive-displacement pump mechanism connected to be driven by the electric motor and the measuring means comprises means for transmitting signals representing the number of cycles of operation of the pump to a remote indicator.

4. A rain gauge as claimed in claim 3 and in which the pump is a peristaltic pump.

5. A rain gauge as claimed in claim 3 and wherein the measuring means comprises an indicator coupled to the drive motion of the pump.

6. A rain gauge as claimed in claim 5 and in which the pump is a peristaltic pump.

7. A rain gauge comprising:
container means for collecting and containing rainwater,
first and second electrical contacts disposed in said container means and separated from each other so that rainwater electrically connects said contacts together when the rainwater reaches a first predetermined level in said container means,
circuit means electrically connected to said first and second contacts for producing a given signal whenever said first and second contacts are electrically connected together by said rainwater,
a peristaltic pump connected to said circuit means for pumping rainwater from said container means when said circuit means produces said given signal, and
means for detecting and indicating the number of cycles of operation of said peristaltic pump and, hence, the amount of rainwater collected.

8. A rain gauge comprising:
container means for collectind and containing rainwater,
capacitor means disposed in said container means so that rainwater alters capacitance of said capacitor means from a first to second value when the rainwater reaches a first predetermined level in said container means,
circuit means electrically connected to said capacitor means for producing a given signal whenever said capacitance of said capacitor means is altered by said rainwater to said second value,
a peristaltic pump connected to said circuit means for pumping rainwater from said container means when said circuit means produces said given signal, and
means for detecting and indicating the number of cycles of operation of said peristaltic pump, and, hence, the amount of rainwater collected.

* * * * *